(12) United States Patent
Oldfield et al.

(10) Patent No.: US 6,708,285 B2
(45) Date of Patent: Mar. 16, 2004

(54) REDUNDANT CONTROLLER DATA STORAGE SYSTEM HAVING SYSTEM AND METHOD FOR HANDLING CONTROLLER RESETS

(75) Inventors: Barry J. Oldfield, Boise, ID (US); Christopher W. Johansson, Horseshoe Bend, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 485 days.

(21) Appl. No.: 09/810,108

(22) Filed: Mar. 15, 2001

(65) Prior Publication Data

US 2002/0133740 A1 Sep. 19, 2002

(51) Int. Cl.⁷ ................................................. G06F 11/00
(52) U.S. Cl. ......................................................... 714/11
(58) Field of Search ........................ 714/6, 7, 8, 9, 714/11, 12, 23, 24; 710/302

(56) References Cited

U.S. PATENT DOCUMENTS

| | | |
|---|---|---|
| 4,958,273 A | 9/1990 | Anderson et al. |
| 5,155,835 A | 10/1992 | Belsan |
| 5,155,845 A | 10/1992 | Beal et al. |
| 5,193,154 A | 3/1993 | Kitajima et al. |
| 5,195,100 A | 3/1993 | Katz et al. |
| 5,204,952 A | 4/1993 | Ayers et al. |
| 5,212,784 A | 5/1993 | Sparks |
| 5,212,785 A | 5/1993 | Powers et al. |
| 5,226,151 A | 7/1993 | Takida et al. |
| 5,237,658 A | 8/1993 | Walker et al. |
| 5,274,645 A | 12/1993 | Idleman et al. |
| 5,278,838 A | 1/1994 | Ng et al. |
| 5,287,462 A | 2/1994 | Jibbe et al. |
| 5,289,418 A | 2/1994 | Youngerth |
| 5,291,494 A | 3/1994 | Bruckert et al. |
| 5,297,258 A | 3/1994 | Hale et al. |
| 5,361,347 A | 11/1994 | Glider et al. |
| 5,379,415 A | 1/1995 | Papenberg et al. |
| 5,388,254 A | 2/1995 | Betz et al. |
| 5,418,921 A | 5/1995 | Courtney et al. |
| 5,437,022 A | 7/1995 | Beardsley et al. |
| 5,459,857 A | 10/1995 | Ludlam et al. |
| 5,495,570 A | 2/1996 | Heugel et al. |
| 5,546,539 A | 8/1996 | Poling |
| 5,553,230 A | 9/1996 | Petersen et al. |
| 5,568,641 A | 10/1996 | Nelson et al. |
| 5,574,863 A | 11/1996 | Nelson et al. |
| 5,666,512 A | 9/1997 | Nelson et al. |
| 5,682,471 A | 10/1997 | Billings et al. |
| 5,699,510 A | 12/1997 | Petersen et al. |
| 5,856,989 A | 1/1999 | Oldfield et al. |
| 5,915,082 A * | 6/1999 | Marshall et al. ............... 714/11 |
| 5,928,367 A | 7/1999 | Nelson et al. |
| 5,960,451 A | 9/1999 | Voigt et al. |
| 6,085,332 A | 7/2000 | El-Batal |
| 6,092,168 A | 7/2000 | Voigt |
| 6,138,247 A * | 10/2000 | McKay et al. ................. 714/10 |
| 6,327,675 B1 * | 12/2001 | Burdett et al. ................. 714/11 |

FOREIGN PATENT DOCUMENTS

JP            4364514 A    12/1992

* cited by examiner

Primary Examiner—Robert Beausoliel
Assistant Examiner—Bryce P. Bonzo

(57) ABSTRACT

A redundant controller data storage system having a system and method for handling controller resets is described. In one aspect, the method of handling a controller reset in a redundant controller system according to the present invention includes the redundant controller system having a first controller and a second controller. A controller reset is detected on the second controller. The first controller is notified of the controller reset via a communication link between the first controller and the second controller. A shutdown process on the first controller and the second controller is performed. The communication link between the first controller and the second controller is disabled, wherein detection of a subsequent controller reset via the second controller cannot be communicated to the first controller via the communication link.

17 Claims, 12 Drawing Sheets

REDUNDANT CONTROLLER DATA STORAGE SYSTEM HAVING SYSTEM AND METHOD FOR HANDLING CONTROLLER RESETS

CROSS REFERENCE TO RELATED APPLICATIONS

This Non-Provisional Patent Application is related to commonly assigned U.S. patent application Ser. No. 09/810,103, filed on Mar. 15, 2001, entitled "Redundant Controller Data Storage System Having On-Line Controller Removal System and Method," which is incorporated herein by reference; and U.S. patent application Ser. No. 09/810,102, filed on Mar. 15, 2001, entitled "Redundant Controller Data Storage System Having Fast Insertion System and Method," which is incorporated herein by reference.

THE FIELD OF THE INVENTION

The present invention generally relates to redundant controller systems and data storage systems employing redundant controllers, and more particularly to a redundant controller data storage system having a system and method for handling controller resets.

BACKGROUND OF THE INVENTION

Multiple controller systems are used for providing highly reliable, redundant data storage systems. For example, in the hard disk drive industry multiple controller systems are used as part of a RAID (short for redundant array of independent disks) system which employs two or more disk drives in combination for improved disk drive fault tolerance and disk drive performance. In operation, RAID systems employ multiple controllers for redundancy. The multiple controllers stripe a user's data across multiple hard disks. The array can operate from any one controller. When mulitple controllers are present, the controllers are used for improved performance and/or increasing the number of host computer system connection ports. When accessing data, the multiple controller RAID system allows all of the hard disks to work at the same time, providing a large increase in speed and reliability.

A RAID system configuration is defined by different RAID levels. The different RAID levels range from LEVEL 0 which provides data striping (spreading out of data blocks of each file across multiple hard disks) resulting in improved disk drive speed and performance but no redundancy. RAID LEVEL 1 provides disk mirroring, resulting in 100 percent redundancy of data through mirrored pairs of hard disks (i.e., identical blocks of data written to two hard disks). Other disk drive RAID LEVELS provide variation of data striping and disk mirroring, and also provide improved error correction for increased performance, fault tolerance, efficiency, and/or cost.

A RAID 5 LEVEL breaks the data into blocks and stripes these across disk drives. A parity block is calculated from the data blocks and also stored to disk. All data and parity blocks are stored on different disks (striped). A failure of any one disk drive results in the loss of only one data block or the parity block. The array can then mathematically recreate the lost block. RAID 5 LEVEL also rotates the disks where the data and parity blocks are stored i.e., all disks will have some parity blocks stored on them). A RAID 6 LEVEL takes this one step further and calculates two "parity" blocks using different mathematical formulas. This allows the array to have two failed disk drives and still be able to recreate all data.

Known multiple controller systems include a mirrored dual controller data storage system. Each controller includes its own memory most of which is the "mirror image" or the same "memory image" as the other. The use of mirrored memory in dual controllers allows for fast recovery and prevents data loss in case of failure or loss of one controller or its memory. Without the mirror copy of memory important data on one controller would be lost if that controller suddenly failed. For example, in a mirrored memory dual controller system having Controller A and Controller B, mirrored reads and writes result in the Controller A memory being the "mirror image" of Controller B memory. Upon the loss or failure of Controller B, all system operations are automatically switched over to Controller A, such that Controller A runs or operates the entire system.

An increasing number of computer system applications require very high degrees of reliability including very limited processor downtime. For example, one known system requires the aggregate controller downtime to be less than five minutes per year. Loss or failure of one controller typically requires immediate replacement to maintain redundancy and reliability for the associated data storage system. Due to the above requirements, systems requiring a high degree of reliability and "uptime" typically require on-line or "hot" insertion of a replacement controller during which the other controller (e.g., Controller A) remains operational. The operating system automatically recognizes the insertion of the replacement controller.

Typically the multiple controller system is connected to a host. As such, the host systems often require that the replacement of a controller board does not bring down the data storage system for a significant amount of time, resulting in a host system timeout. Insertion of the replacement controller into an operational system often causes system availability loss while the replacement controller is tested and added to the operational system. When the replacement controller is being added as part of a mirrored memory system, problems associated with adding the replacement controller into an operational system are increased.

In one known mirrored memory dual controller system, with Controller A operating in a system and replacement Controller B being hot inserted, includes both Controller A and replacement Controller B being reset and each controller performing a processor's subsystem self-test. Each controller tests its own shared memory system to verify the hardware is functioning correctly. Each controller checks its shared memory contents to see if the memory image is "valid" for its system. In this example, only Controller A will have a valid memory image of the system.

Next, each controller exchanges information about their revision, last view of the system and the system status the last time the system was active. After sharing this information, the firmware determines which controller has the valid memory image. In this example, Controller A has the valid memory image. Controller A's shared memory image is copied to Controller B and verified. This requires the processor on Controller A to read all shared memory on Controller A and writing to all shared memory locations on Controller B. The memories on both controllers then read and compare to verify the copy operation was successful. For large memory systems, this process takes several minutes. Final configuration steps are performed, and the controllers are brought on-line and are fully operational. Many steps within the above process can take tens of seconds to perform. The process of copying Controller A shared memory image to Controller B and verifying can take several minutes. During this extended period of time required for hot insertion, most host computer operating systems will time-out.

It is desirable to have a hot insertion and/or system and method for use in a redundant, mirrored memory multiple controller system which reduces system downtime and does not result in a time-out of the host computer operating system. Further, it is desirable to have an efficient method of handling controller resets which minimizes system down time or host time-outs.

SUMMARY OF THE INVENTION

The present invention relates to multiple controller systems and data storage systems employing redundant controllers, and more particularly to a redundant controller data storage system having a system and method for handling controller resets.

In one embodiment, the present invention provides a method of handling a controller reset in a redundant controller system. The redundant controller system includes a first controller and a second controller. The method includes detecting a controller reset on the second controller. Notifying the first controller of the controller reset via a communication link between the first controller and the second controller. Performing a shutdown process on the first controller and the second controller. Disabling the communication link between the first controller and the second controller, wherein detection of a subsequent controller reset via the second controller can now be communicated to the first controller via the communication link.

In another embodiment, the present invention provides a method of handling a controller reset in a redundant controller system. The redundant controller system includes a first controller and a second controller. The method includes detecting a controller reset on the second controller. The first controller is notified of the controller reset via a communication link between the first controller and the second controller. A shutdown process if performed on the first controller and the second controller. The first controller and the second controller are brought on-line. The first controller and the second controller are reset. The communication link is disabled between the first controller and the second controller, wherein detection of a subsequent controller reset via the second controller cannot be communicated to the first controller via the communication link.

In another embodiment, the present invention provides a redundant controller system configured for handling controller resets. The redundant controller system includes a first controller and a second controller in communication with the first controller via a communications bus. If a controller reset is detected by the second controller, the first controller is notified of the controller reset via the communication link. A shutdown process is performed on the first controller and the second controller. The communication link is disabled to prohibit notification of subsequent controller resets on the second controller via the communication link.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
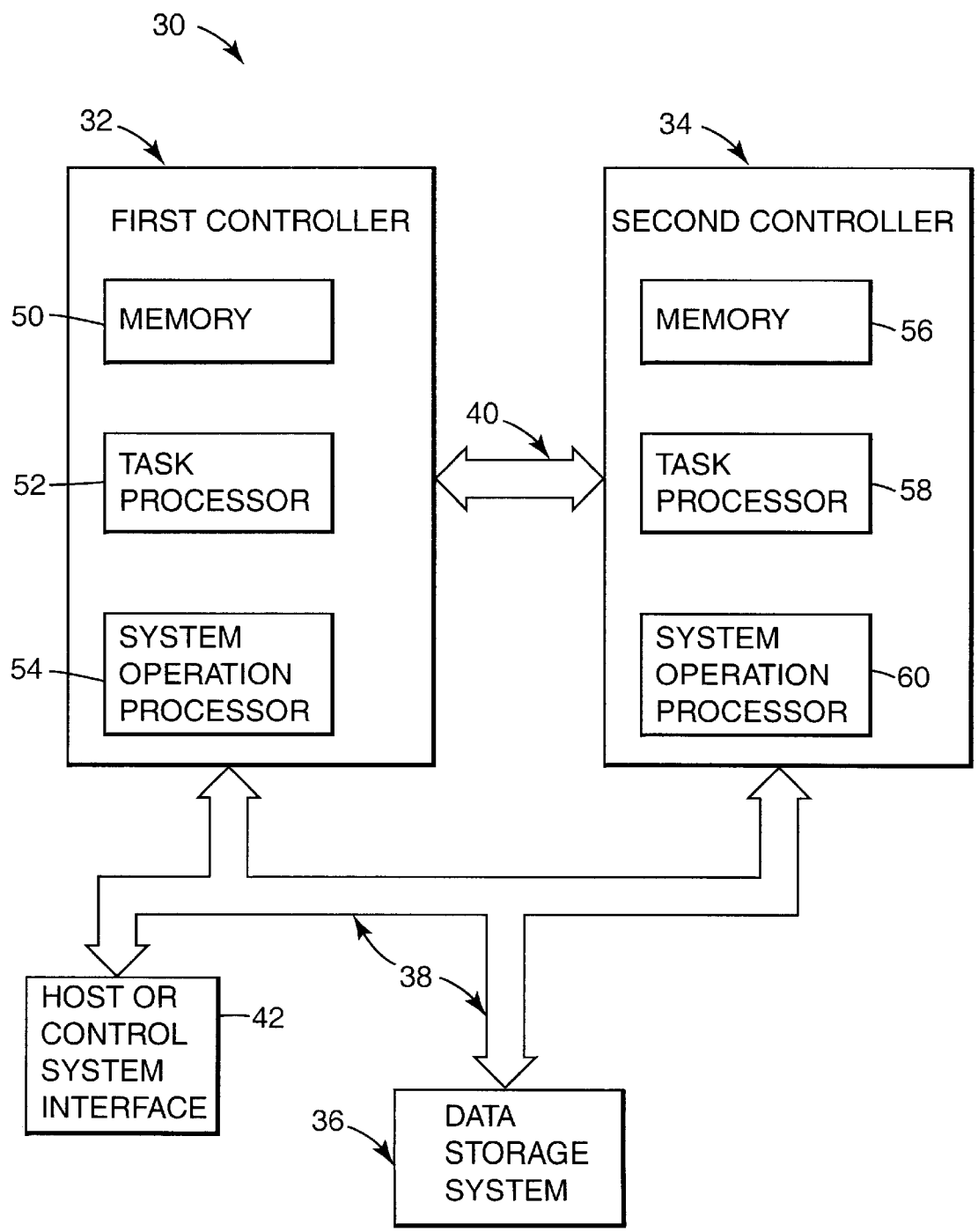
FIG. 1 is a diagram illustrating one exemplary embodiment of a redundant controller data storage system configured for hot insertion of a redundant controller, according to the present invention.

In FIG. 1, one exemplary embodiment of a redundant controller data storage system according to the present invention is generally shown at 30. The redundant controller data storage system provides a redundant, mirrored memory, multiple controller system having an on-line or "hot" insertion system and method which reduces system downtime and does not result in a time-out of a host computer operating system during changeout of a controller. In one aspect, the redundant controller data storage system 30 is a dual controller system. Although exemplary embodiments described herein refer to a dual controller system, these embodiments are equally applicable to other multiple controller environments (i.e., systems having more than two controllers).

Components of the present invention can be implemented in hardware via a microprocessor, programmable logic, or state machine, and firmware, or in software within a given device. In one preferred embodiment, one or more components of the present invention reside in software and are employed via hardware. Components of the present invention may also reside in software on one or more computer-readable mediums. The term computer-readable medium as used herein is defined to include any kind of memory, volatile or nonvolatile, such as floppy disks, hard disks, CD-ROMs, flash memory, read-only memory (ROM), and random access memory (RAM). In addition, the system according to the present invention can employ a microprocessor embedded system/appliance incorporating tailored appliance hardware and/or dedicated single purpose hardware.

In one exemplary embodiment, the system 30 is a redundant mirrored controller data storage system having a first controller 32 and a second controller 34. The first controller 32 and the second controller 34 are configured for the redundant or mirrored reading and writing of data to data storage system 36 (e.g., such as a disk array via a communications bus 38). RAID LEVEL 1 includes mode mirror writes and the array can read from either copy, for RAID LEVEL 5 or 6 a user's accesses are striped across the disk array. Further, first controller 32 and second controller 34 communicate with each other via a communications bus 40. First controller 32 and second controller 34 communicate with data storage system 36 and each other using a communications bus protocol. In one aspect, the communications bus protocol is a standard protocol. Other suitable communications bus protocols will become apparent to those skilled in the art after reading the present application. Data storage system 36 may comprise a magnetic hard disk data storage system. In other aspects, data storage system 36 includes other read/writeable data storage media, such as flash memory, random access memory (RAM), CD-writeable media, magneto-optical media, etc.

The redundant controller data storage system is configured to communicate with a host or control system via host or control system interface 42. The host or control system 42 may be a server, computer network, central computer, or other control system. In one aspect, the redundant controller data storage system 30 is configured to interface with a host, and operate as a RAID system (e.g., RAID LEVEL 0, RAID LEVEL 1, RAID LEVEL 2, RAID LEVEL 3, RAID LEVEL 4, RAID LEVEL 5, or RAID LEVEL 6 system).

In one embodiment, the first controller 32 includes a "mirrored" memory 50, a task processor 52, and a system operation processor 54. Similarly, second controller 34 includes a "mirrored" memory 56, a task processor 58, and a system operation 60. First controller 32 and second controller 34 include "memory controllers" which operate memory 50 and memory 56 as part of a mirrored memory system. The term "mirrored memory" as used herein is defined to include a system where the memory image of one memory is duplicated or "mirrored" to another memory. In the present invention, memory 50 of first controller 32 is duplicated or "mirrored" in the memory 56 of second controller 34. The dual controller, mirrored memory system provides a fault tolerant environment for redundant controller system 30. In the event of a failure of one of the controllers, or one of the controller memory systems, the existence of the other controller and its mirrored memory provides a seamless fail-over for continued processing of system commands. Further, upon removal and insertion of one of the controllers, the present invention provides for maintaining the operating system via the other controller, and reducing system downtime to time periods below that of the timeout period of the host. One exemplary embodiment of a mirrored memory dual controller disk storage system is disclosed in U.S. Pat. No. 5,699,510 to Peterson et al., issued Dec. 16, 1997 and assigned to Hewlett-Packard Company of Palo Alto, Calif., which is incorporated herein by reference. Another mirrored memory dual controller disk storage system is disclosed in U.S. Pat. No. 5,928,367 to Nelson et al., issued Jul. 27, 1999 and assigned to Hewlett-Packard Company of Palo Alto, Calif., which is also incorporated herein by reference.

In the redundant controller data storage system 30 according to the present invention, each controller 32, 34 includes its own memory 50, 56 which is the "mirror image" or having the same "memory image" as the other as indicated above. The mirrored memories allow for fast recovery in case of failure or loss of one controller or its memory. In one aspect, mirrored reads and mirrored writes result in first controller 32 memory 50 being the "mirror image" of second controller 34 memory 56. Upon the loss or failure of second controller 34, all system operations are automatically switched over to first controller 32, such that first controller 32 runs or operates the entire system at a single controller system until another controller is inserted into the system.

The redundant controller data storage system 30 according to the present invention provides for continued operation of the redundant controller system during hot insertion or on-line insertion of one of the controllers. For example, upon the loss or failure of a second controller, the redundant controller system is operated via the first controller 32. Second controller 34 can be on-line or "hot" inserted into the system 30. In particular, system operation processor 54 continues to process system operation commands, such as the reading and writing of data to data storage system 36 via memory 50 during the hot insertion process of bringing second controller 34 into the system. Task processor 52 processes background tasks during the processing of system operation commands via system operation processor 54, without imposing a delay on the redundant controller data storage system 30.

In one preferred embodiment, the task processor 52 operates to copy the memory image of first mirrored memory 50 to second memory 56 while the system operation processor 54 continues to process system operation commands. As such, hot insertion of the second controller 34 into the redundant controller system 30 does not result in undo delay to the processing of system operation commands and/or a timeout by a host system via host system interface 42. In one exemplary embodiment, task processor 52 performs background tasks without direct involvement of system operation processor 54 or other system processors, via specialized data processing hardware. In one aspect, the data processing hardware is coupled to an intelligent DMA engine, as part of an application specific integrated circuit (ASIC). Task processor 52 has the ability to process specific background tasks during continued operation of the first controller 32 via system operation processor 50. In one aspect, task processor 52 operates to perform a memory-to-memory copy task, a memory self-test, as well as other tasks.

Figure 2:
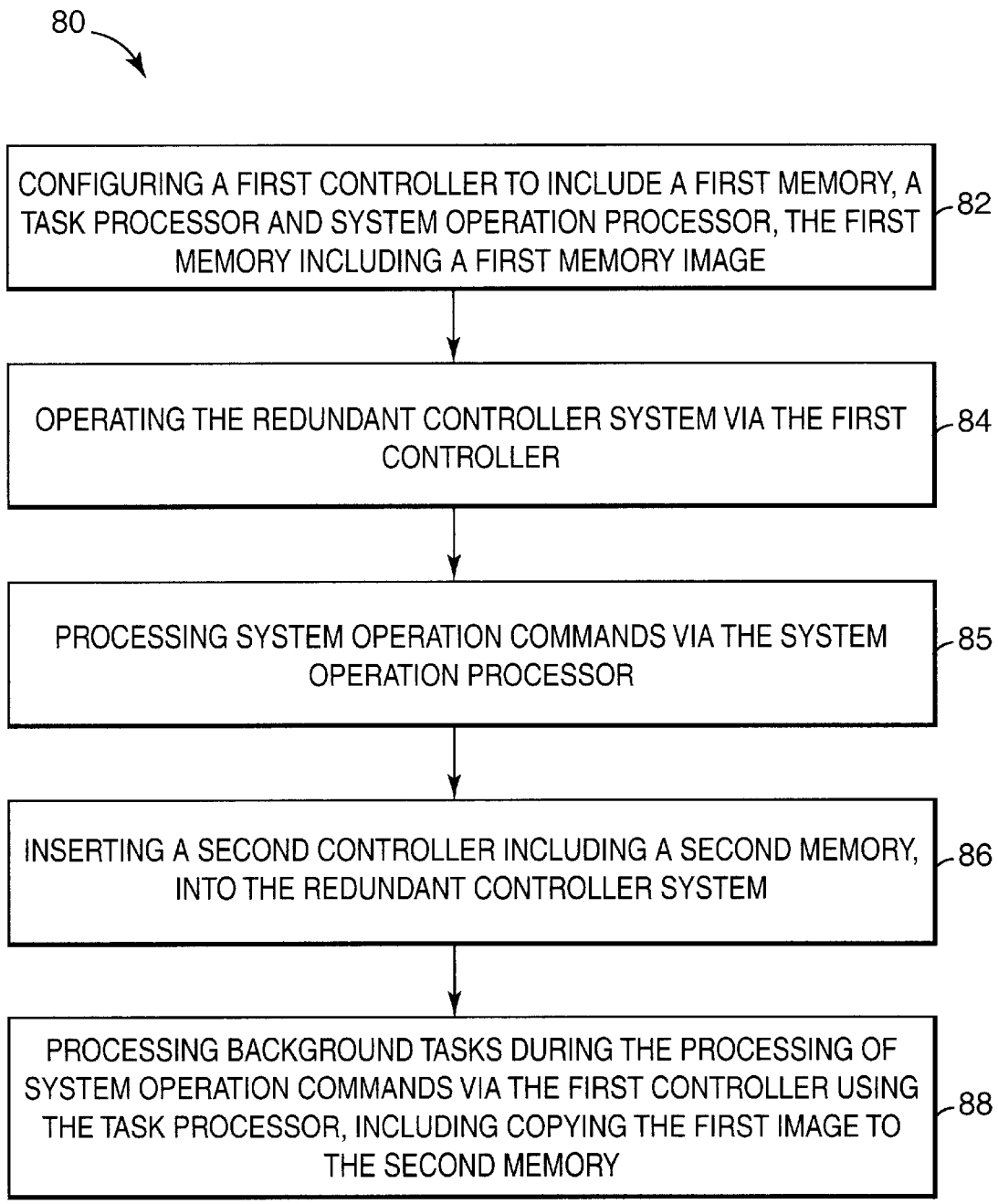
FIG. 2 is a diagram illustrating one exemplary embodiment of a method for hot insertion of a controller in a redundant controller data storage system according to the present invention.

FIG. 2 is a diagram illustrating one exemplary embodiment of a method of hot inserting a controller into a redundant controller data storage system according to the present invention, and is generally shown at 80. The method includes configuring a first controller to include a first memory, a task processor, and a system operation processor. The first memory includes a first memory image. In one exemplary embodiment shown, first controller 32 is configured to include memory 50, task processor 52 and system operation processor 54. The redundant controller system 30 is operated via the first controller 32 as a single controller system, indicated at 84. At 85, system operation commands are processed via the system operation processor 54. At 86, a second controller 34 is inserted into the redundant controller system 30. The second controller 34 includes the second memory 56. At 88, background tasks are processed during the processing of system operation commands via the first controller, using the task processor 52. The background tasks include copying the first image of memory 50 to the second memory 56.

Figure 3:
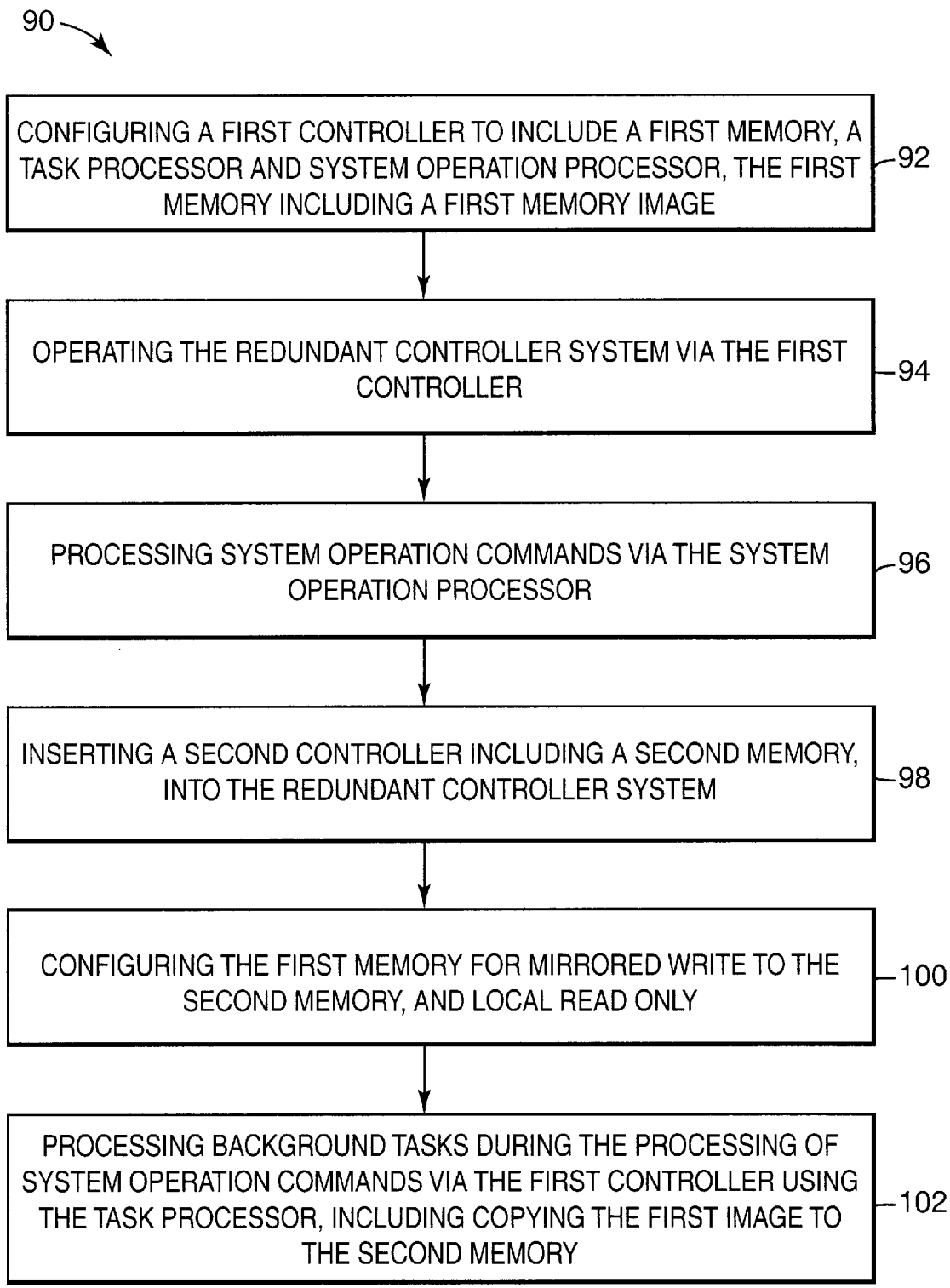
FIG. 3 is a diagram illustrating another exemplary embodiment of a method of hot inserting a controller in a redundant controller system according to the present invention.

FIG. 3 is a diagram illustrating another exemplary embodiment of a method of hot inserting a controller into a redundant controller data storage system according to the present invention, shown generally at 90. The method includes configuring first controller 32 to include first memory 50, task processor 52, and system operation processor 54, indicated generally at 92. The first memory 50 includes a first memory image. At 94, the redundant controller system 30 is operated via the first controller 32. At 96, system operation commands are processed via the system operation processor 54. At 98, second controller 34 is inserted into the redundant controller system 30. The second controller includes a second memory 56. The first memory 50 is configured for mirrored write to the second memory 56, and local read only to shared or mirrored memory 50. As such, first controller 32 can operate to read its own memory image, but does not operate as a mirrored write and mirrored read until the second controller 34 is fully operational (i.e. finishes self-tests and is brought on-line) in the redundant controller data storage system 30. At 102, background tasks are processed during the processing of system operation commands via the first controller 32. The background tasks are processed using task processor 52. The background tasks include copying the first image of memory 50 to the second memory 56.

Figure 4:
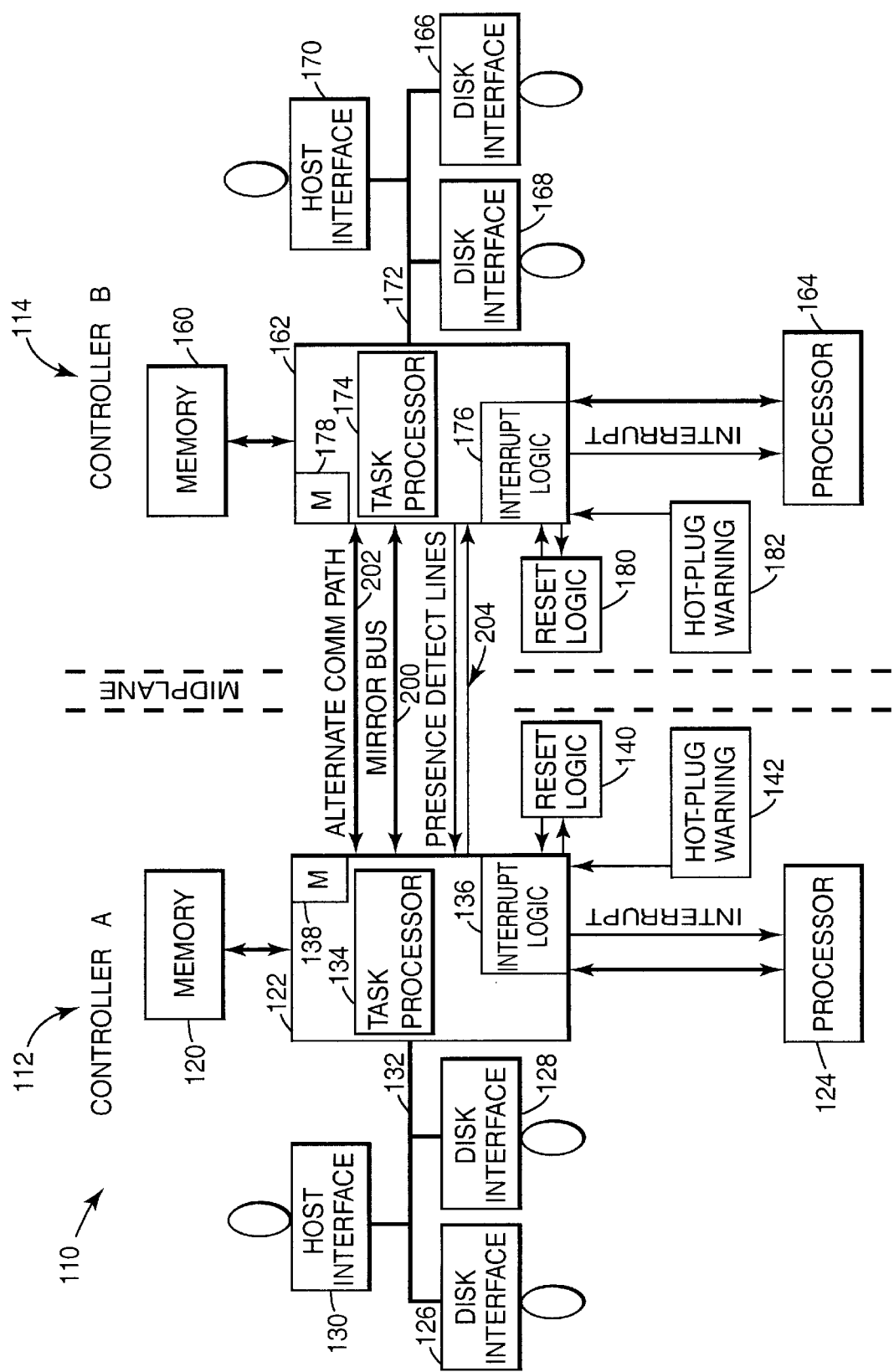
FIG. 4 is a block diagram illustrating another exemplary embodiment of a redundant controller data storage system configured for hot insertion of a redundant controller according to the present invention.

In FIG. 4, another exemplary embodiment of a redundant controller data storage system according to the present invention is generally shown at 110. The redundant controller data storage system 110 is similar to the redundant controller data storage system 30 previously described herein. The redundant controller data storage system 110 includes a system and method of hot inserting a controller into the redundant controller data storage system which minimizes any interruptions to the processing of system operating commands or which may cause the host system to timeout.

Redundant controller data storage system 110 includes a first redundant controller 112 and a second redundant controller 114. First controller 112 includes first mirrored memory 120, first memory controller 122, and first system operation processor 124. In one aspect, the first controller 112 communicates with a data storage system via disk interface 126 and disk interface 128, and communicates with a host or control system via a host interface 130. In one aspect, first controller 112 communicates with disk interface 126, disk interface 128 and host interface 130 via a communications bus 132. In one embodiment, the communications bus 132 is configured as a PCI bus as known to one skilled in the art. In one embodiment, the host and disk interfaces shown at 130, 126, & 128 are Fibre Channel busses that can operate as a "FC Loop". Other suitable bus configurations will become apparent to one skilled in the art after reading the present application.

In one aspect, memory controller 122 include a task processor 134, interrupt logic 136, and a memory buffer/communications module 138. In one aspect, task processor 134 includes dedicated firmware and/or memory buffer components for processing predefined background tasks without interrupting the processing of system operation commands via system operation processor 136. A hot plug warning/early detection system for memory controller 122 is indicated at 142. Similarly, reset logic for memory controller 122 is indicated at 140.

Similarly, the redundant second controller 114 includes second shared or mirrored memory 160, the second memory controller 162, and second system operation processor 164. The second controller 114 communicates with a data storage system via disk interface 166, disk interface 168 and communicates with a host/control system via host interface 170. The second controller 114 communicates with the disk interface 166, disk interface 168 and host interface 170 via communications bus 172.

Second memory controller 162 includes task processor 174, interrupt logic 176 and memory/communications module 178. Reset logic for second controller 114 is indicated at 180. A hot plug warning/early detection system is provided to the second memory controller 162 and indicated at 182. First controller 112 and second controller 114 communicate via a communications bus between the controllers. In one aspect, a mirror bus 200 links first controller 112 and second controller 114 at first memory controller 122 and second memory controller 162. Further, an alternate communication path is provided between first memory controller 122 and second memory controller 162, indicated at 202. The alternate communication path is linked to first memory controller 122 at memory/communications module 138, and the alternate communications path 202 is linked to second memory controller 162 at second memory/communications module 178. Presence detect lines 204 provide communication between the first controller 112 and second controller 14 of the presence of the controllers (e.g., as part of a hot insertion process).

In one embodiment, memory 120 and memory 160 are random access memory (RAM). In one exemplary embodiment, the random access memory is synchronous dynamic random access memory (SDRAM). In one aspect, the size of memory 120 and memory 160 can range from 512 bytes through many gigabytes. In one preferred embodiment, memory 120 and memory 160 are nonvolatile memory, such as battery-backed RAM, such that upon power-down (e.g., a controller reset), the memory retains its memory contents (i.e., its memory state).

In one aspect, memory controller 122 and memory controller 162 are part of an application specific integrated circuit (ASIC) chip or module. Task processor 134 and task processor 174 operate to process predefined, dedicated background tasks during the processing of system commands via system operation processors.

In one embodiment, all background tasks or functions performed by task processor 134 operate on data stored in memory 120 or memory 160, and the results of these tasks are placed back into the appropriate memory 120 or memory 160. The task processors 134, 174 perform the background task functions without direct involvement of other system processors, such as processor 124 or processor 164, using dedicated data processing hardware. In one aspect, task processors 134 and/or task processor 174 utilizes data processing hardware coupled with an intelligent DMA engine, which can be part of the ASIC chip or module. Exemplary embodiments of task processor 134 and task processor 174 are described in greater detail later in this specification.

In one aspect, mirrored reads or mirrored writes between first memory 120 and second memory 160 are accomplished via mirror bus 200. Further, alternate communications path or bus 202 exists between memory controller 122 and memory controller 162. As such, once a controller has been inserted into the redundant controller data storage system, but not yet brought "on-line" as part of the redundant controller system, first memory controller 122 is able to communicate with second memory controller 162 via alternate communication path 202. Such communications may include exchanging hardware and firmware revision information, exchanging serial numbers to detect when a controller has been changed in the system, exchange information about each other's operational status, and inform each other when it is time to move to the next step in the hot-insertion sequence. The communication bus is also used to negotiate which controller should remain operational when a failure prevents communication through the mirror bus 200. Other areas of firmware use this bus for other purposes. Hot plug warning 142 and hot plug warning 182 operate to provide an early detection signal to corresponding memory controllers 122 and 162 that a controller is being hot inserted into the redundant controller system. The early warning logic works with the reset logic to hold a hot-inserted controller in reset until the controller is fully seated. During, hot-removal, early detection signal provides early warning of removal of a controller. The hot plug warning 142 and hot plug warning 182 early detection systems may receive an early detection signal via a mechanical or electrical means, such as through the use of a connector pin, push button warning, sensor detection (e.g., an optical sensor), or other detection system. Presence detect lines 204 operate to notify the other controller that a controller has been removed or inserted into the system.

Processor 124 and processor 164 are system operation processors which communicate with corresponding memory 120 and memory 160 via memory controller 122 and memory controller 162 for operation of system commands. Such system commands include system commands received via host interface 130 and host interface 170 for reading and writing of data at a corresponding data storage system via disk interfaces 126, 132, 166, 168. Processors 124, 164 operate to perform other system operations such as a system interrupt operation, a reset operation, or the processing and management of other system processes.

Figure 5:
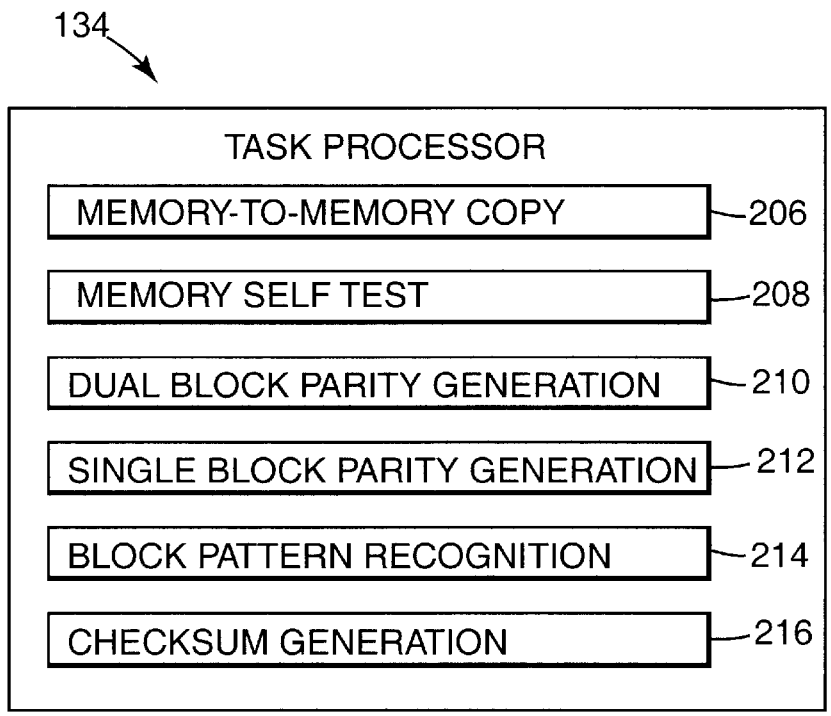
FIG. 5 is a diagram illustrating one exemplary embodiment of a task processor used in a redundant controller data storage system according to the present invention.

FIG. 5 is a diagram illustrating one exemplary embodiment of a task processor used in a redundant controller system according to the present invention. Although task processor 134 is shown as an example, task processor 174 is similar to task processor 134. Preferably task processor 134 performs predefined functions via data processing hardware. These tasks are processed as "background tasks," and as such, may be accomplished during operation of system commands via the system operation processor 124. In one exemplary embodiment, task processor 134 includes a memory-to-memory copy task 206 for copying a memory image between memory 120 and memory 160. Task processor 134 also includes one or more memory self-test tasks 208 for performing a self-test of the associated memory 120. The memory self-test 208 may be performed upon insertion of a controller into the redundant controller system, or at any time during operation of the redundant controller system 110. A typical memory self-test includes reading a memory image, memory chunk or a block of data and saving it to an internal buffer (e.g., a buffer internal to memory controller 122). A test pattern is written to the memory block and read back to verify correctness. This step is repeated with more test patterns. In one aspect, the task processor can run from 1 to 30 patterns in a single launched test. The original block of data that was stored in the internal buffer is written back to the external memory block. This process is repeated until all blocks of memory have been tested. Other task processor 134 tasks may include dual block parity generation 210, single block parity generation 212, block pattern recognition 214, and checksum generation 216.

Figure 6:
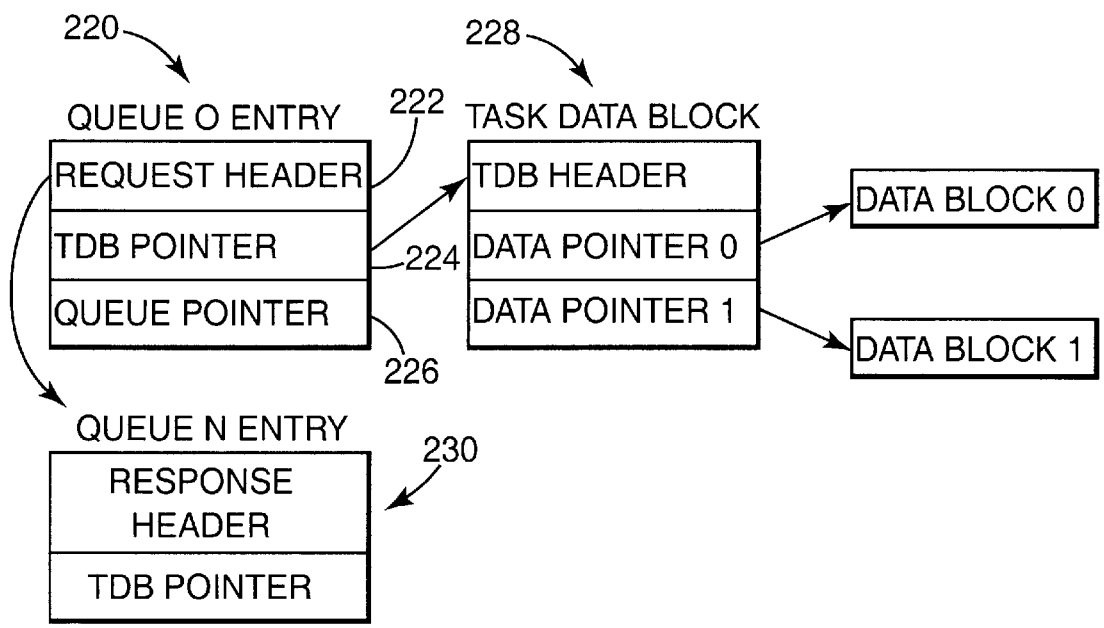
FIG. 6 is a diagram illustrating one exemplary embodiment of a data structure utilized by a task processor in a redundant controller system according to the present invention.

FIG. 6 is diagram illustrating one exemplary embodiment of a data structure used by task processor 134 and task processor 174 to process task operations. Other suitable data structures will become apparent to one skilled in the art after reading the present application. In one exemplary embodiment, the requesting processor writes a task description block (TDB) into memory 120. The task description block contains the command code and command-specific information needed to process the request (block addresses, block size, data patterns, pointers to parity coefficient, etc.). The requesting processor then inserts a request entry into the request queue (e.g., queue 0 indicated at 220) local to the task processor 134. This entry contains a command code request header 222, a TDB pointer 224 to the associated task description block, and a queue number for the response indicated as queue pointer 226.

When queue 0 220 signals that it is not empty, the task processor reads a request entry from the queue 220. Using the request information, the task processor reads the task data block 228, and checks that it is consistent with the request. The task processor then executes the desired function. The task processor places a completion response entry into the designated response queue, indicated at 230. The requesting processor 124 is notified of the completion through the response queue 230.

Figure 7:
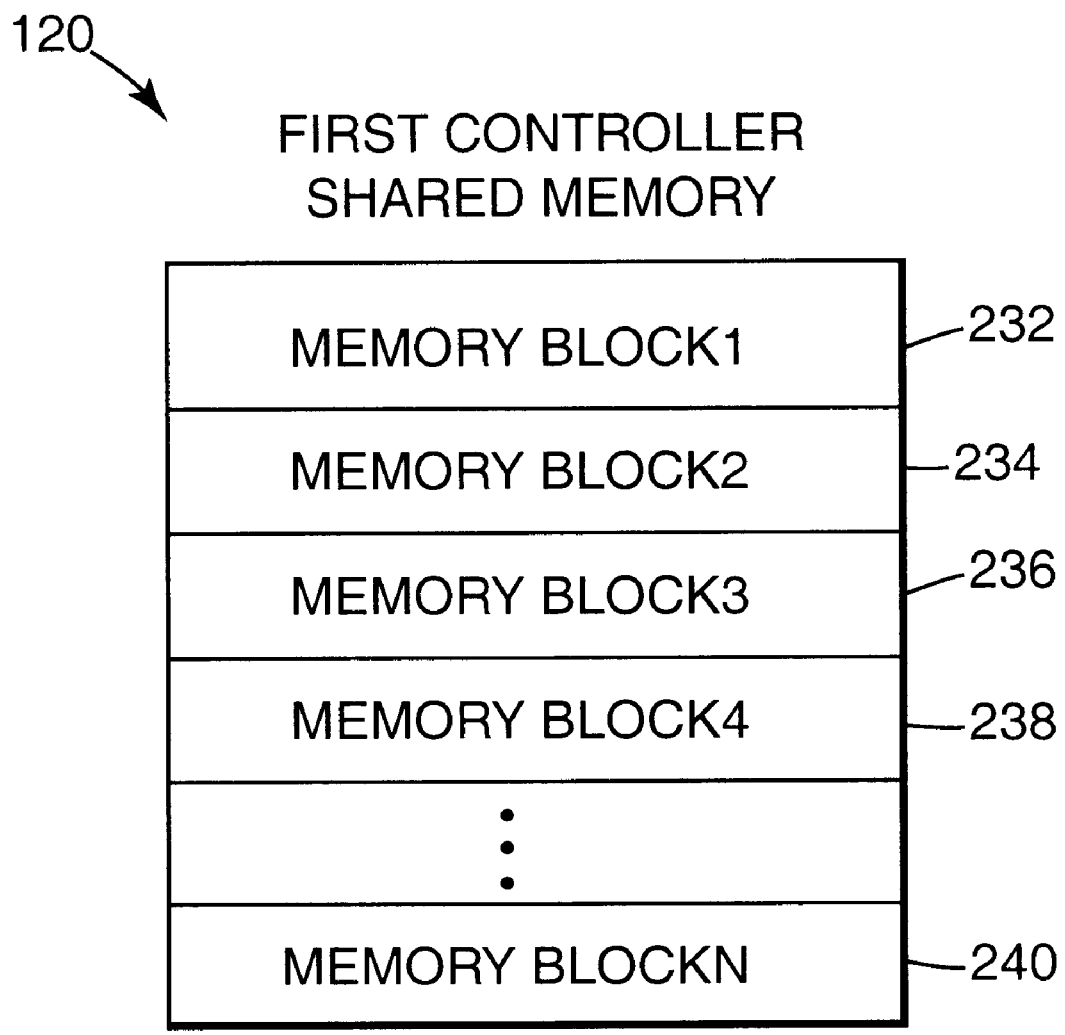
FIG. 7 is a diagram illustrating one exemplary embodiment of a controller shared memory having a memory image configured into memory blanks, used in a redundant controller data storage system according to the present invention.

FIG. 7 is a diagram illustrating one exemplary embodiment of the memory image contained within first memory 120 divided into memory blocks suitable for processing by task processor 134. In particular, background tasks processed by task processor 134 may operate on data blocks stored in memory 120 that are much too large to be buffered inside of the memory controller 122, including particular task processor 134. As such, the task processor 134 operates to configure the memory image or blocks into memory blocks or chunks that correspond to a size which may be handled by the task processor. In the exemplary embodiment shown, the memory image stored in first memory 120 is configured into memory block 1 232, memory block 2 234, memory block 3 236, memory block 4 238 through memory block N 240. In one aspect, each chunk is a maximum 512 bytes, which is small enough to allow internal buffering inside the memory controller 122 but large enough to make efficient use of the task processing system. In one aspect, task processor 134 operates to configure the sizes of the memory blocks to obtain the fewest number of memory blocks per memory image, while operating within the limits of the memory controller 122. In one aspect, wherein the largest usable memory block is 512 bytes, the task processor 134 configures the memory image into blocks wherein only the first memory block and last memory blocks can be less than the maximum or 512 bytes. In the exemplary embodiment shown, memory block 1 232 and memory block N 240 can be less than the maximum memory block size. Memory block 2 234, memory block 3 236, and memory block 4 238, etc., will be the maximum memory block size (e.g., 512 bytes).

Both the task processor 134 and system operation processor 124 operate on data stored in memory 120. It is desirable to configure the redundant controller system 110 such that the redundant controller system is able to continue the processing of system command during the processing of tasks via task processor 134, including adding a second controller into the redundant controller system. As such, a priority is assigned between task processor 134 and other system operations such as those accomplished via processor 124 for accessing memory 120. In one preferred embodiment, task processor 134 is assigned a priority lower than processor 124 (e.g., the lowest priority), such that the performance of the operating system is not degraded excessively by the operation of background tasks via task processor 134. Alternatively, the memory access priority of task processor 134 may be the same or higher than other system operations. Alternatively, firmware can be utilized to raise the memory access priority of individual tasks accomplished via task processor 134.

Figure 8:
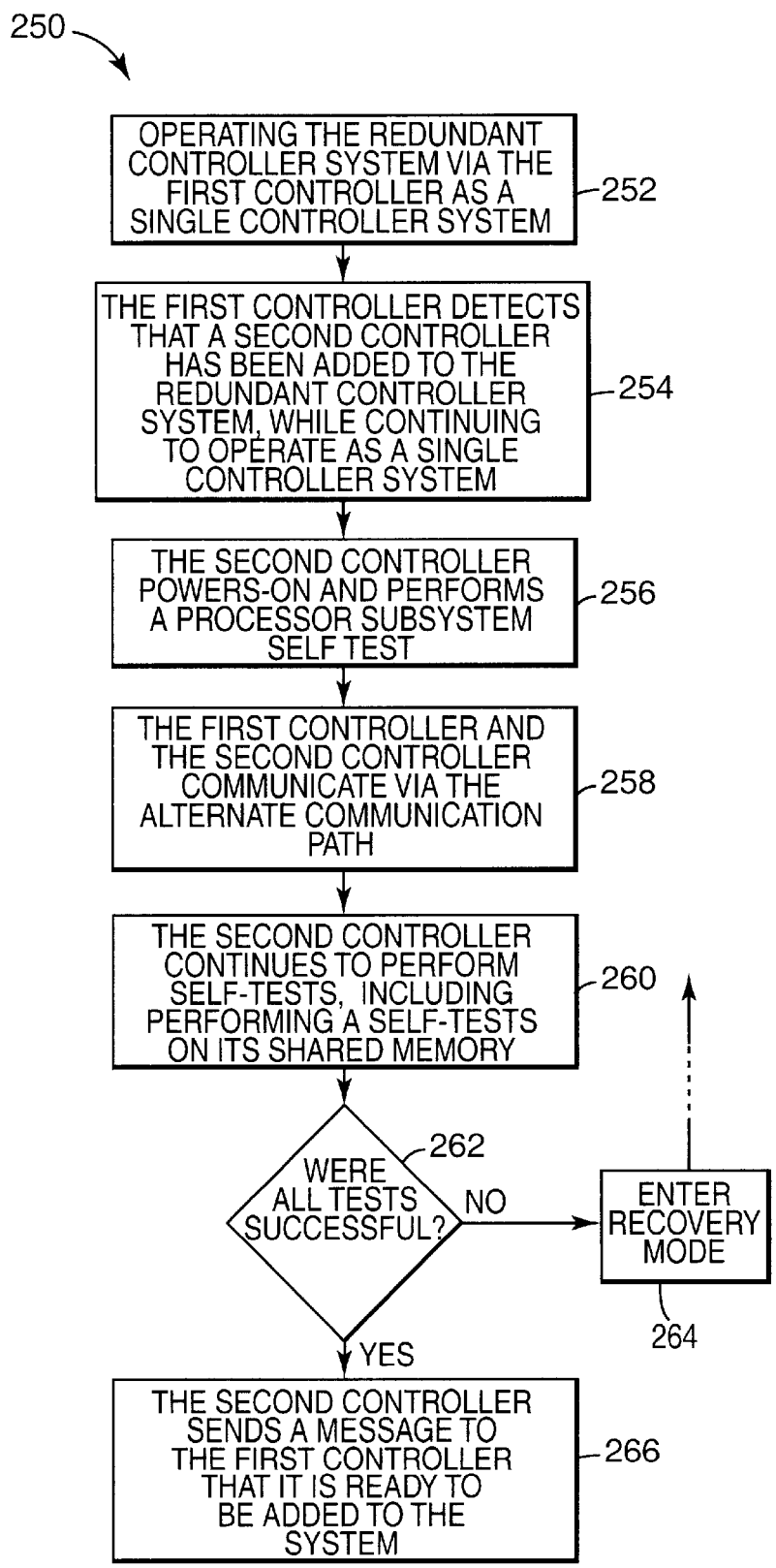
FIG. 8 is a diagram illustrating one exemplary embodiment of a method of hot inserting a controller in a redundant controller system according to the present invention.
Figure 9:
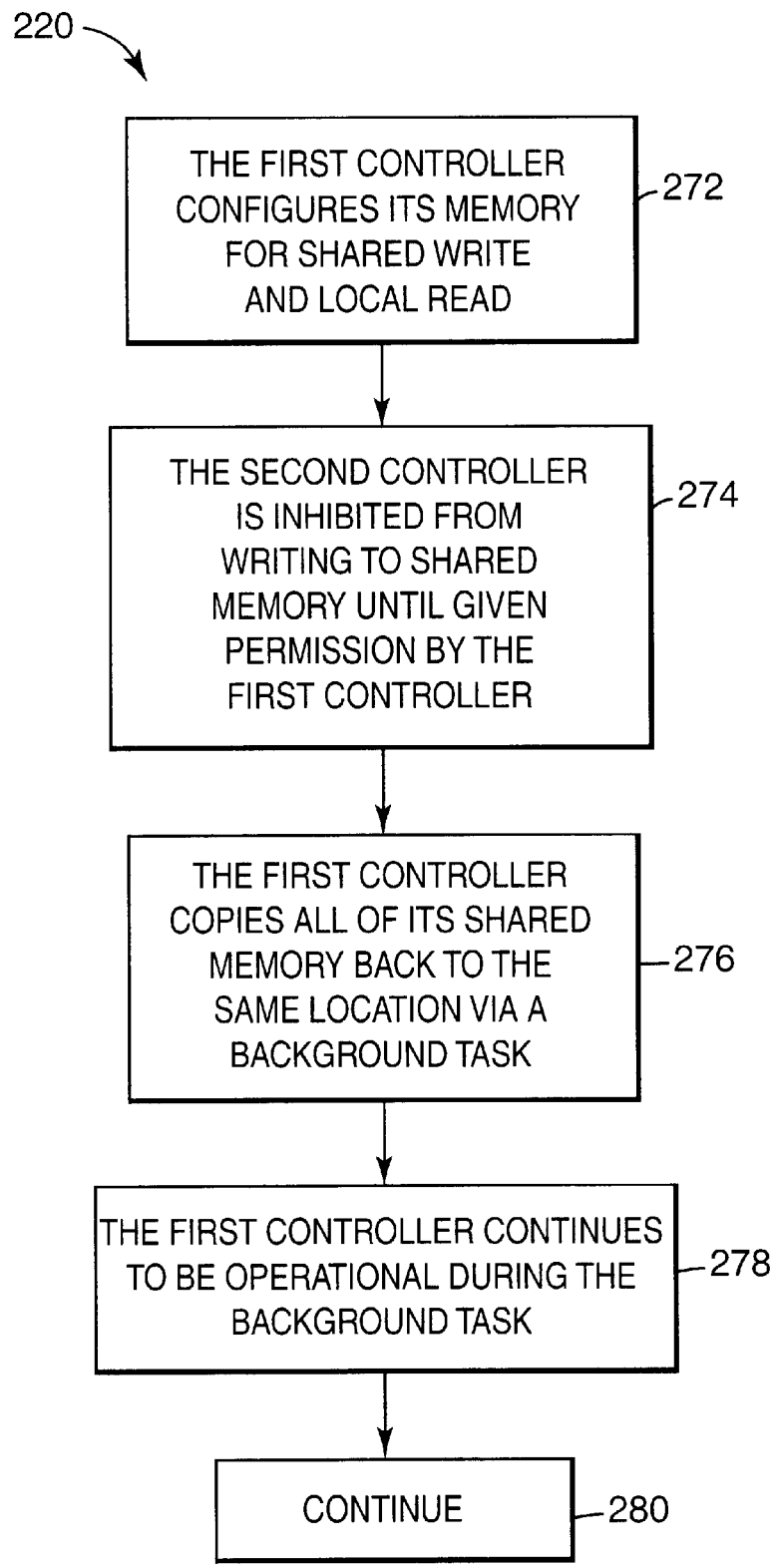
FIG. 9 is a diagram further illustrating one exemplary embodiment of a method of hot inserting a controller in a redundant controller system according to the present invention.
Figure 10:
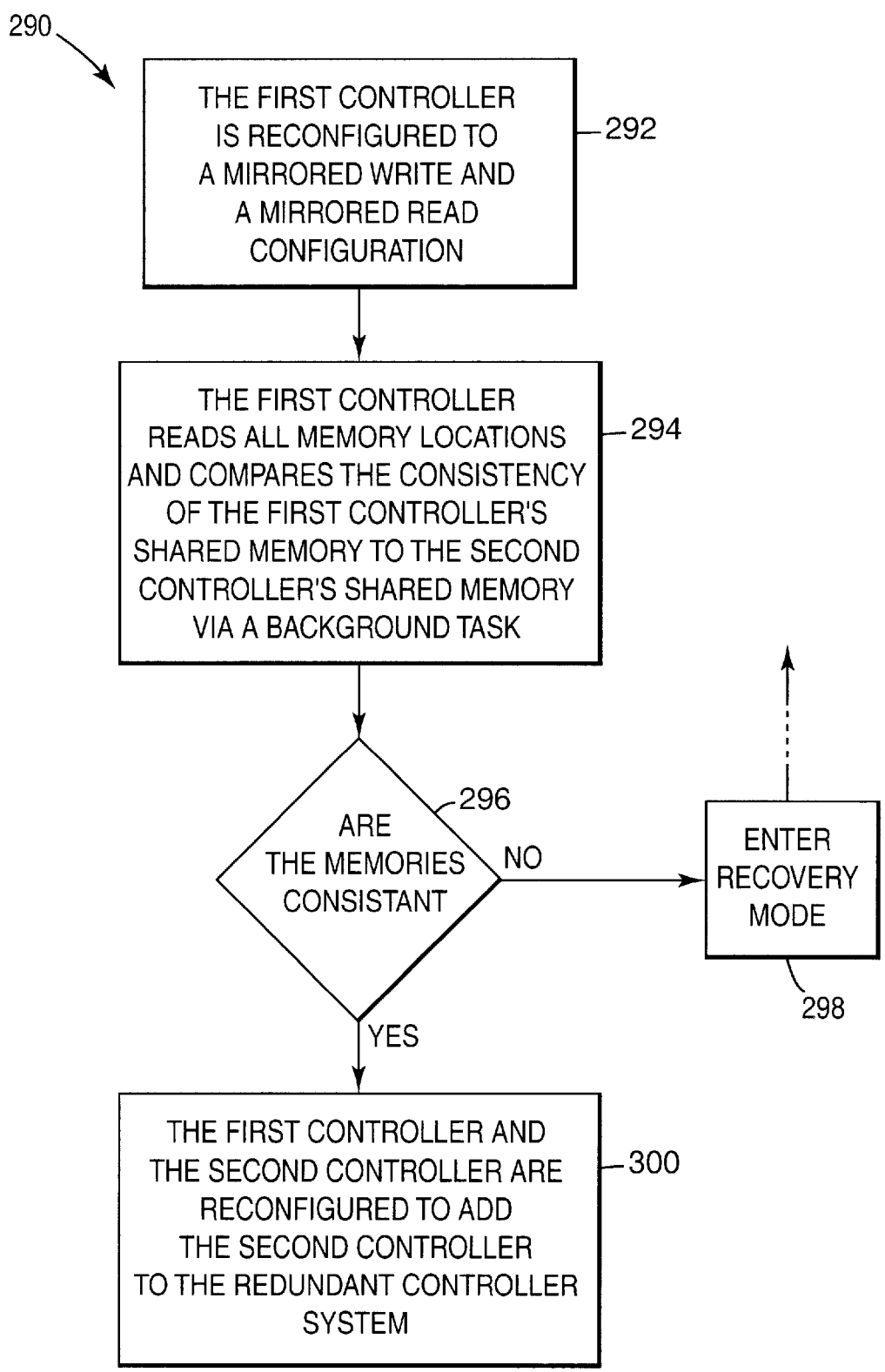
FIG. 10 is a diagram further illustrating one exemplary embodiment of a method of hot inserting a controller in a redundant controller system according to the present invention.

FIGS. 8–10 illustrate one exemplary embodiment of on-line "hot" inserting a controller into a redundant controller system according to the present invention which minimizes system interruptions, reference is also made to FIGS. 1–7 previously described herein.

In FIG. 8, a diagram illustrating one exemplary embodiment of a method of hot inserting a controller in a redundant controller system according to the present invention is generally shown at 250. In this exemplary embodiment, the redundant controller system is being operated via first controller 112, having a second controller that has been removed from the redundant controller system. At 252, the redundant controller system 110 is operated via the first controller 112 as a single controller system. At 254, the first controller 112 detects that a second controller 114 has been added to the redundant controller system 110. After detection that the second controller 114 has been added to the redundant controller system 110, the first controller 112 continues to operate as a single controller system. The first controller receives a detection signal indicating that the second controller 114 has been added to the redundant controller system 110. In one aspect, when second controller 114 is hot inserted into the redundant controller system 110, the controller is held in reset until it is completely inserted and latched in place. The presence detect lines detect the new controller's arrival. The presence of the inserted controller 114 is then communicated to the first controller 112 via presence detect lines 204.

At 256, the second controller 114 powers-on, waits to be latched in place, then performs a processor subsystem self-test. The processor subsystem self-test includes testing its firmware image located in FLASH ROM, testing microprocessor local memories, performing peripheral chip register and data path tests. At 258, the first controller 112 and the second controller 114 communicate via the alternate communication path 202. The first controller 112 and the second controller 114 communicate with each other via alternate communication path 202 and memory/communication module 138 and memory/communication module 178, even though the second controller 114 has not yet been brought "on-line" as part of the redundant controller system 110. Sample communications between the first controller 112 and the second controller 114 via the alternate communications path 202 include exchange hardware and firmware revision information to confirm compatibility between controllers, notification when tests are completed along with the outcome of the tests, and communication of synchronization points between controllers during the hot-insertion process.

At 260, the second controller continues to perform self-tests, including performing a self-test on its shared memory. As previously described herein, these tests can be performed via task processor 174 as a background task without interruption to the system. At 262, if all of the tests were not successful, a recovery mode 264 is entered. Recovery mode 264 may include providing an error condition to the redundant controller system and/or host. In one embodiment, the controller is marked as bad and kept off-line. The process is started over with another controller. If all tests were successful, at 266 the second controller 114 sends a message to the first controller 112 that it is ready to be added to the redundant controller system 110.

In FIG. 9, a diagram further illustrating method of hot inserting a controller into a redundant controller system according to the present invention is indicated generally at 220. At 272, the first controller 112 configures its memory 120 for shared write and local read only. As such, at that point forward any data written to memory 120 is also mirrored or written to the second controller 114 memory 160. As part of the redundant controller system 110, only data can be read from memory 120 since at this point the memory image of memory 160 is not a "mirror" copy of the memory image of memory 120. At 274, the second controller 114 is inhibited from writing to shared memory 120 and its own memory 160 until given permission (e.g., via the alternate communication path 202) by the first controller 112.

At 276, the first controller 112 copies all of its shared memory 120 back to the same location in shared memory 120 via a background task. In particular, task processor 134 includes a background task in which the task processor 134 reads a memory block from memory 120, stores it in a buffer, and writes the memory block to the same location in memory 120. The result of this operation is that since first controller 112 is configured in a shared write mode, the first controller 112 locally reads memory blocks from memory blocks 120, but when the first controller 112 writes back to the same location in memory 120, it is also writing to the same location in second controller 114 memory 160. At 278, during this background task, the first controller 112 continues to be operational in performing system operation commands via processor 124. In one aspect, the memory image is copied one memory block at a time. After completion of the background task, the memory image of first memory 120 is now the mirror of the memory image of the second memory 160, and the process of adding second controller 114 to the redundant controller system 110 continues, indicated at 280.

FIG. 10 is a diagram illustrating one exemplary embodiment of a method of adding a controller to a redundant controller system according to the present invention, after the memory image of the first controller 120 has been mirrored or copied to the memory of second controller memory 160, indicated at 290. At 292, the first controller 112 is reconfigured to a mirrored write and a mirrored read mode or configuration. Data locations may now be both read and written to both first memory 120 and second memory 160. At 294, the first controller 112 reads all memory locations and compares the consistency of the first controller's shared memory 120 to the second controller's shared memory 160 using a background task via task processor 134. As such, system operation commands are not interrupted at this time. At 296, if the memories are not consistent a recovery mode 298 is entered. If the memories are consistent, at 300, the first controller 112 and the second controller 114 are reconfigured to add the second controller to the redundant controller system 110. The redundant controller system 110 is now fully operational as a mirrored memory, redundant controller system. Further, a second controller was hot inserted into the redundant controller system with minimal interruptions to the processing of system operations, and without causing a host timeout.

Controller Resets

In known dual controller systems, a reset on one controller would cause an interrupt to the other controller's microprocessor. At that time, the receiving controller's processor had to deal with the interrupt and the cause of the reset. This past method has many known disadvantages. The timing of the resets between the first controller and the second controller is variable. When a controller is stuck in a "reset loop," the reset interrupts the other controller's processor, and the state changes of less sophisticated mirroring interfaces cause distracting activity that affects controller system performance. If the second controller has a "stuck" or erratic processor, the first controller is not able to cause a reset on a second controller since the second controller's processor is not available to service the interrupt. The first controller must now fall back on a "watchdog" mode of reset generation to recover the system. A much longer window of opportunity exists for the second controller to cause damage to data stored using the system.

Figure 11:
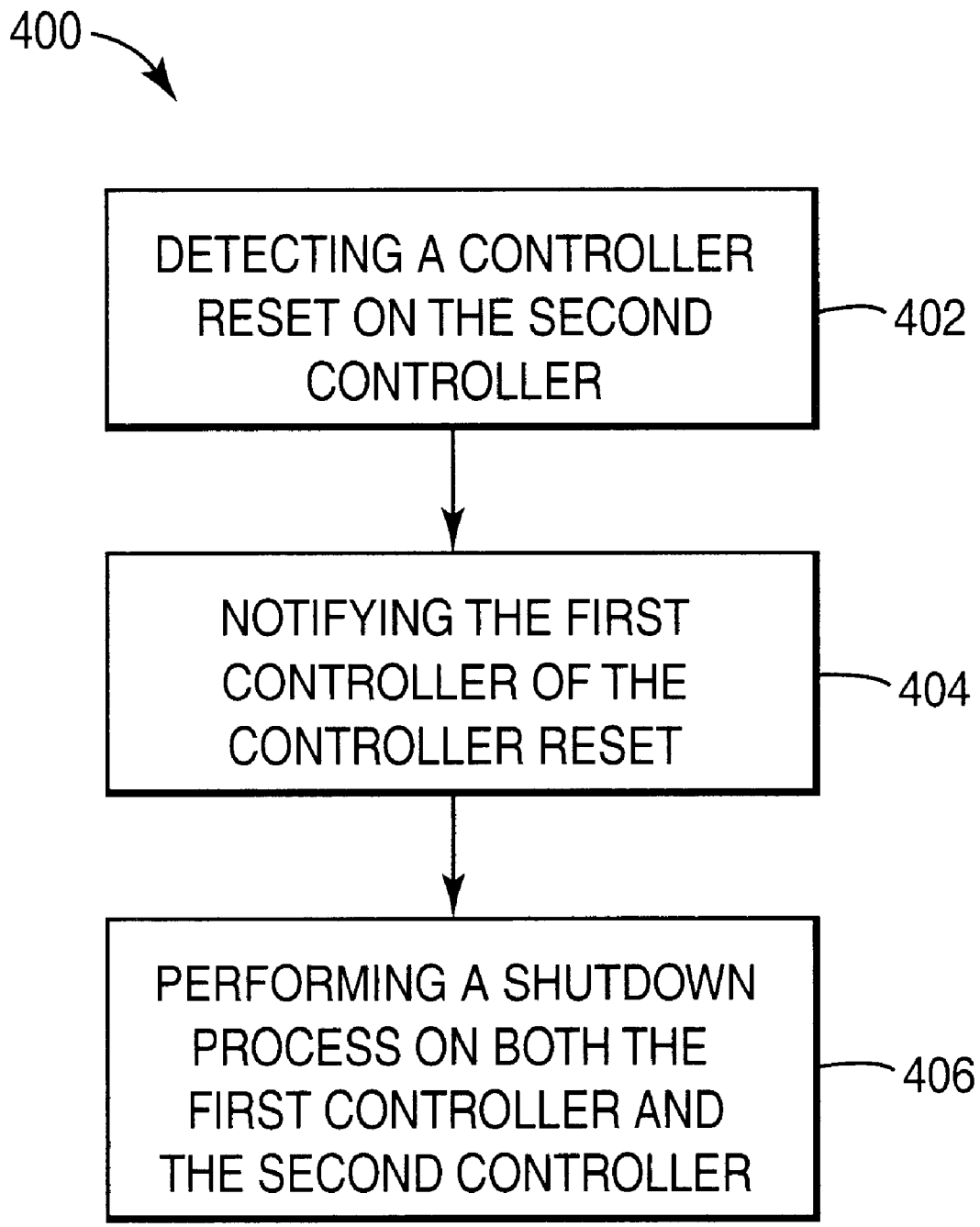
FIG. 11 is a diagram illustrating one exemplary embodiment of a method of handling a controller reset in a redundant controller system according to the present invention.
Figure 12:
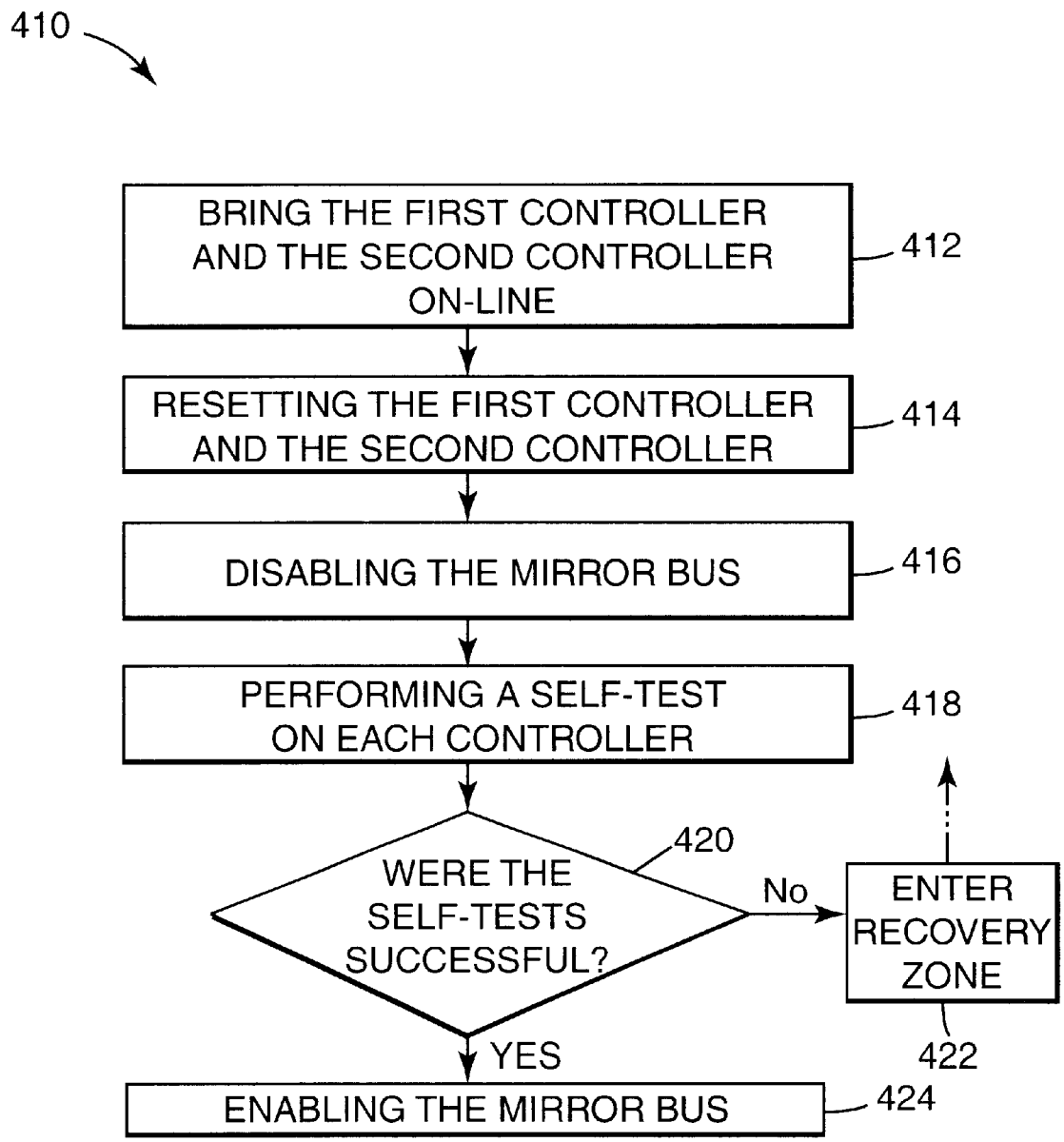
FIG. 12 is a diagram further illustrating one exemplary embodiment of a method of handling a controller reset in a redundant controller system according to the present invention.

FIGS. 11 and 12 are diagrams illustrating one exemplary embodiment of a system and method of handling controller resets using the redundant controller system according to the present invention. The method of handling controller resets using the redundant controller system according to the present invention provides for localization of resets on one controller such that the resets are only able to propagate to a second controller when the mirroring bus is enabled. This prevents a faulty controller from holding all controllers in reset. Reference is also made to FIGS. 1–10 previously described herein.

In FIG. 11, one exemplary embodiment of a method of handing controller resets in a multiple, redundant controller system according to the present invention is shown generally at 400. The redundant controller system includes first controller 112 and second controller 114 actively connected and operating as a mirrored pair and at 402, a reset condition is detected on the second controller 114. The second controller 114 is reset and begins a shutdown process. At 404, the shutdown process includes notifying the first controller 112 of the controller reset via a communications link between the first controller 112 and the second controller 114. In one preferred embodiment, the first controller is notified of the reset occurring on the second controller via mirror bus 200. At 406, a shutdown process is performed on both the first controller 112 and the second controller 114. As such, both the first controller 112 and the second controller 114 go through a shutdown process at the same time.

In FIG. 12, a diagram further illustrating one exemplary embodiment of a method of resetting a controller in a dual controller system according to the present invention is generally shown at 410. At 412, after the shutdown process on both controllers is complete, the first controller 112 and the second controller 114 are powered-up. The shutdown flushes all internal buffers and parks the memories. At 414, as part of the process, the first controller and the second controller are reset. At 416, the mirror bus 200 interface between the first controller 112 and the second controller 114 is disabled. In one aspect, the act of resetting the first controller 112 and the second controller 114 causes disabling of the mirror bus 200. The act of disabling the mirror bus prevents further propagation of resets between boards from occurring until the mirror bus is re-enabled.

At 418, each controller, first controller 112 and second controller 114 perform a self-test. The self-test typically includes testing the microprocessor subsystem and SDRAM memory as previously described in this application, as well as testing internal memory controller ASICs 122 and 162 and all data path busses.

At this time, the mirror bus 200 interface between first controller 112 and second controller 114 remains disabled. As such, any resets or interrupts that may occur due to one of the controllers, or as a result of a self-test, does not affect the other controller. At 420, if the self-tests were not successful, the controller on which the unsuccessful self-test exists enters a recovery mode at 422. Typically, the recovery mode includes generating an error to the host computer system informing it of the failure and removing the "bad" controller from use in the array. The remaining "good" controller will then start operation in a single controller mode where mirroring of data is not necessary.

If the self-tests were successful for both the first controller 112 and the second controller 114, at 424 the mirror bus 200 interface between the first controller 112 and the second controller 114 is enabled. As such, the first controller 112 and second controller 114 have verified that the reset or cause of the reset has been cleared and they may again continue to operate as a mirrored pair.

The above method of handling controller resets using the redundant controller system according to the present invention provides for localization of resets on one controller such that the resets are not able to propagate to a second controller unless enabled along with the mirroring bus. This provides the benefits of hardware management of reset synchronization between multiple controller boards while still enabling a method for the system firmware to disable a controller from being allowed to reset all controllers in the system.

Controller Removal

When an on-line controller is removed from a redundant controller data storage system, downtime can be experienced if the controller is "partially removed" or not correctly removed. Typically this occurs because the redundant controllers are brought to a quiescent state or held in reset for the duration of the on-line removal event.

Known processes for on-line removal of a controller from a redundant controller system includes an early warning switch or short connector pin which provides a warning to the redundant controller system that a controller is being removed. The warning causes the controller to finish the controller's current memory access, and then place the controller's non-volatile memory into a self-refresh mode. After the controller is entirely disconnected (e.g., disconnection of the long controller detect pin), the other "paired" controller is allowed to resume operation for controlling the redundant controller system. For systems utilizing a detection pin connector, partially removed controllers can hold a system inactive until the detection pin entirely breaks contact. This setup provides an opportunity for an incorrect procedure, such as the controller being only "partially removed" from the redundant controller system, to extend the online removal downtime passed the host operating systems time-out period.

Figure 13:
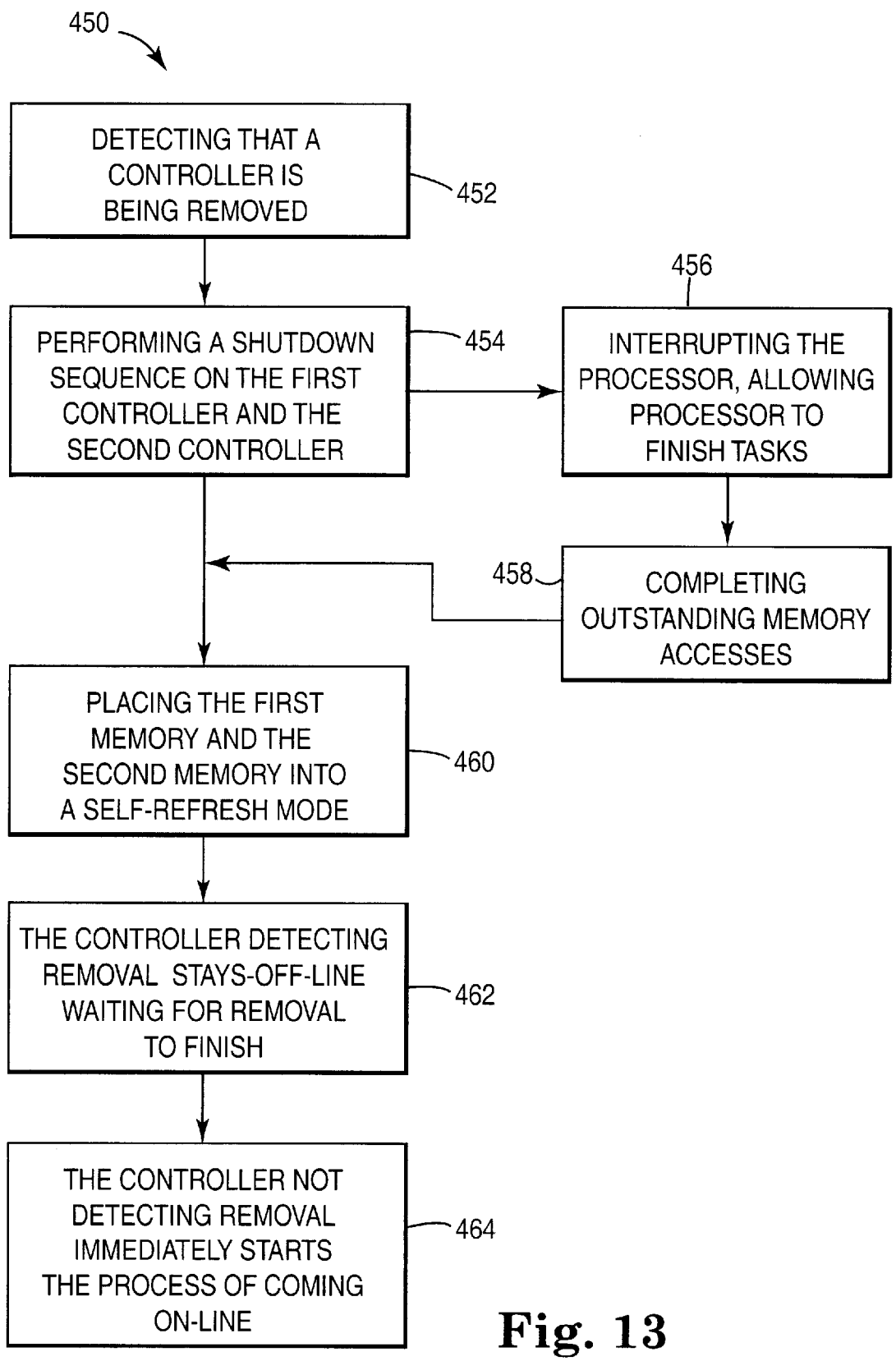
FIG. 13 is a diagram illustrating one exemplary embodiment of a method of removing a controller in a redundant controller system according to the present invention.

FIG. 13 is a diagram illustrating one exemplary embodiment of a method of on-line removal of a controller from a redundant controller system according to the present invention. The method is shown generally at 450. The on-line removal method 450 provides for safe on-line removal of a controller from a redundant controller system, while minimizing redundant controller system downtime.

At 452, is it detected that a controller is being removed from the redundant controller system 110. Reference is also made to FIGS. 1–12 previously described herein. In one aspect, an early warning switch or short pin on a connector provides a warning to the system 110 that a controller is being removed as such, preferably the detection occurs prior to total disconnection of the controller from the redundant controller system 110. The warning is received via hot plug warning 142 or hot plug warning 182. In one exemplary embodiment described herein, first controller 112 is removed from the redundant controller system 110.

At 454, upon detection that first controller 112 is being removed from the redundant controller system 110, a shutdown sequence is performed on the first controller 112 and the second controller 114. At 456, in one aspect, the shutdown sequence for each controller includes interrupting the controller's processor, and allowing the processor to finish its active processing tasks. At 458, the shutdown sequence for each controller further includes completing outstanding memory accesses to memory 120 and memory 160, and flushing of internal buffers. As part of the shutdown process, the memory controller 122 writes a status word to memory 120, and memory controller 162 writes a status word to memory 160.

In one preferred embodiment, first memory 120 and second memory 160 have a self-refresh mode, and more preferably include a battery back-up. After completion of a shutdown sequence on the first controller 112 and the second controller 114, the first memory 120 and the second memory 160 are placed into a self-refresh mode by their corresponding memory controller, the first memory controller 122 and the second memory controller 162. At 462, the controller detecting removal stays off-line waiting for removal to finish. Its memory stays in a self-refresh mode. At 464, the controller not detecting removal immediately starts the process of coming on-line. In the exemplary embodiment described herein, after completion of a self-refresh process on memory 120, first controller 112 detecting removal stays off-line waiting for removal to finish and memory 120 stays in a self-refresh mode (in one aspect, the memory is battery backed DRAM). The second controller 114 not detecting removal immediately starts the process of coming on-line, minimizing downtime of the redundant controller system. The memory 160 (e.g., a battery backed DRAM) is brought out of the self-refresh mode, and has retained the previously written status word for use by the memory controller.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of handling a controller reset in a redundant controller system having a first controller and a second controller, comprising:

detecting a controller reset on the second controller;

notifying the first controller of the controller reset via a communication link between the first controller and the second controller;

performing a shutdown process on the first controller and the second controller; and disabling the communication link between first controller and the second controller, wherein detection of a subsequent controller reset via the second controller cannot be communicated to the first controller via the communication link.

2. The method of claim 1, further comprising bringing the first controller and the second controller on-line.

3. The method of claim 1, further comprising resetting the first controller and the second controller.

4. The method of claim 1, wherein the step of disabling the communication link includes the step of providing the communication link between the first controller and the second controller via a mirror bus; and disabling the mirror bus.

5. The method of claim 4, further comprising performing a self-test on the first controller and the second controller.

6. The method of claim 5, further comprising if the self-test was not successful on the first controller or the second controller, then entering a recovery mode.

7. The method of claim 5, wherein if the self-test was successful on the first controller and if the self test was successful on the second controller, then enabling the communication link between the first controller and the second controller.

8. A method of handling a controller reset in a redundant controller system having a first controller and a second controller, comprising:

detecting a controller reset on the second controller;

notifying the first controller of the controller reset via a communication link between the first controller and the second controller;

performing a shutdown process on the first controller and the second controller;

bringing the first controller and the second controller on-line;

resetting the first controller and the second controller; and disabling the communication link between first controller and the second controller, wherein detection of a subsequent controller reset via the second controller cannot be communicated to the first controller via the communication link.

9. The method of claim 8, wherein the step of disabling the communication link includes the step of providing the communication link between the first controller and the second controller via a mirror bus; and disabling the mirror bus.

10. The method of claim 8, further comprising performing a self-test on the first controller and the second controller.

11. The method of claim 10, further comprising if the self-test was not successful on the first controller or the second controller, then entering a recovery mode.

12. The method of claim 10, wherein if the self-test was successful on the first controller and if the self test was successful on the second controller, then enabling the communication link between the firs controller and the second controller.

13. A redundant controller system configured for handling controller resets comprising:

a first controller; and a second controller in communication with the first controller via a communication link, wherein upon detection of a controller reset by the second controller, the first controller is notified of the controller reset via the communication link, a shutdown process is performed on the first controller and the second controller, and the communication link is disabled to prohibit notification of subsequent controller resets on the second controller via the communication link.

14. The system of claim 13, wherein after shutdown, the first controller and the second controller are reset.

15. The system of claim 13, wherein after shutdown, the first controller and the second controller are powered-up.

16. The system of claim 15, wherein after the first controller and the second controller are powered-up, the first controller and the second controller perform a self-test while the communication link is disabled.

17. The system of claim 16, wherein if the self-tests are successful, the communication link between the first controller and the second controller is enabled.

* * * * *